United States Patent
Bondley

[15] 3,691,607
[45] Sept. 19, 1972

[54] HIGH TEMPERATURE BRAZING ALLOY SYSTEM

[72] Inventor: Ralph J. Bondley, Scotia, N.Y.
[73] Assignee: General Electric Company
[22] Filed: Jan. 18, 1971
[21] Appl. No.: 107,011

[52] U.S. Cl..................29/194, 29/198, 75/134 V
[51] Int. Cl....................B32b 15/02, C22c 27/00
[58] Field of Search..........29/198, 194; 75/134 V

[56] References Cited

OTHER PUBLICATIONS

"Constitution of Binary Alloys, First Supplement," Rodney P. Elliott, pages 859–860, New York, McGraw-Hill, 1965.

*Primary Examiner*—L. Dewayne Rutledge
*Assistant Examiner*—E. L. Weise
*Attorney*—Nathan J. Cornfeld, John P. Taylor, Frank L. Neuhauser, Oscar B. Waddell and Joseph B. Forman

[57] ABSTRACT

A high temperature, low vapor pressure, brazing alloy system is disclosed which is useful for assembling components of electron tubes. The brazing alloy is particularly useful in the assembly of refractory elements such as cathodes and heaters because degradation of emission caused by the metals comprising the brazing alloy is minimal.

4 Claims, 1 Drawing Figure

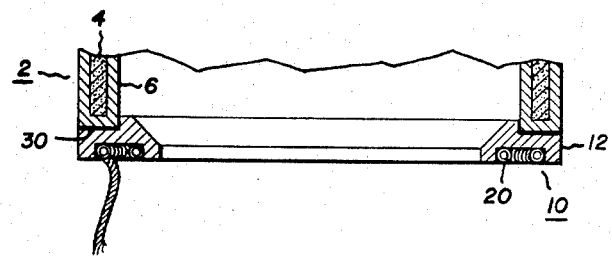
INVENTOR:
RALPH J. BONDLEY,
BY John R. Taylor
HIS ATTORNEY.

HIGH TEMPERATURE BRAZING ALLOY SYSTEM

The invention herein described was made in the course of or under a contract or subcontract thereunder with the Department of the Army.

BACKGROUND OF THE INVENTION

This invention relates to high temperature brazing alloys. More particularly, the invention relates to brazing material which is useful for joining components of electron tubes such as refractory matrix cathodes which operate in a high temperature range of over 1,000°C.

Many vacuum devices, such as electron tubes and various components or subassemblies of electron tubes are conveniently fabricated by brazing techniques. Various metals and alloys are used for this purpose. The particular properties of the brazing alloy desired are determined by the environment and end usage. For example, if the brazing alloy is used in the fabrication of a device such as an electron tube which will be operated at elevated temperatures in vacuum, the vapor pressure of the alloy becomes a critical property. If the alloy is used in the fabrication of a cathode, it must not adversely effect the thermionic emission of the cathode by coating the emitting surface of the brazing alloy or otherwise contaminating it by metal migration, diffusion, or alloying. The problem is particularly acute in the case of refractory matrix cathodes operating in the range of 1,000° to 1,400°C, as there are very few known metals or alloys having melting points above these temperatures which also meet the vapor pressure criteria.

Nickel-molybdenum alloys, having a melting point above 1,305°C have often been used as a brazing alloy for this type of application. However, the use of this alloy in fabricating barium-strontium-tungstate matrix cathodes invariably results in reduced cathode activity. Another alloy with a melting point in the 1,400°C range which has been used is composed of thorium and hafnium. The deterioration in cathode performance when using this alloy as a brazing material is less severe. However, the alloy is difficult to fabricate and use, since it can only be handled in vacuum or inert atmospheres — not in a reducing atmosphere. The flow characteristics of this active alloy are also difficult to control or predict.

SUMMARY OF THE INVENTION

It is therefore an object of this invention to provide a high melting point, low vapor pressure, and low contamination brazing alloy particularly for high temperature devices to be operated in vacuum. These and other objects of the invention will be apparent from the drawings and description.

In accordance with the invention a brazing system comprising a high melting point alloy of tungsten and vanadium is provided. The alloy comprises a composition of about 4.5 atomic percent tungsten (15 weight percent) and about 95.5 atomic percent vanadium (85 weight percent) having a melting point of about 1,635°C.

BRIEF DESCRIPTION OF THE DRAWINGS

FIG. 1 is a cross section of a cathode and heater assembly bonded together using the brazing alloy of the invention.

DESCRIPTION OF THE PREFERRED EMBODIMENT

As previously described above, the brazing alloy of the invention comprises a Tungsten-Vanadium alloy. The composition of the alloy is about 4.5 atomic percent or 15 weight percent tungsten and about 95.5 atomic percent or 85 weight percent vanadium representing a minimum melting point or eutectic mixture melting at about 1,635°C.

The alloy can be conveniently prepared in situ by previously mixing powdered tungsten and powdered vanadium in the proper weight proportions, preparing a slurry of this mixture by mixing the powdered mixture with a fugitive liquid such as water, ethyl alcohol, and amyl acetate or the like and applying it to the portions or areas of the parts to be joined. Vanadium hydride can be substituted for the powdered element vanadium with equally favorable results.

The alloy could also be made into a thin foil and the foil then applied as strips on the surfaces to be joined. This form is preferred when accurate control of the amounts is desired.

In accordance with the invention, the alloy is used to join together refractory metals such as molybdenum or tungsten. The term refractory metals is defined as the group consisting of hafnium, zirconium, vanadium, niobium, tantalum, molybdenum, and tungsten.

After the alloy mixture has been applied to the areas of the parts to be joined the materials are heated to above 1,650°C in hydrogen, vacuum, or other non-reacting atmosphere. The tungsten-vanadium powder forms a liquid phase and flows and wets the surfaces of the refractory metals being joined together.

Referring now to FIG. 1, an example of the invention is illustrated. A hollow cathode 2 is illustrated comprising a barium-strontium-tungstate matrix 4 within a molybdenum metal sleeve 6. In the illustrated embodiment, the brazing alloy is used at 30 to join cathode 2 to a heater 10 both for mechanical strength and to increase the heat conductivity from heater 10 to cathode 2. Heater 10 comprises a circular ring 12 of a refractory metal such as molybdenum having embedded therein heater coils 20 which comprise tungsten wire wound around a Molybdenum-Rehnium core. The heater coils heat the molybdenum metal and the heat is then transmitted to the cathode through braze 30.

To join the cathode and the heater together, a powdered mixture of the alloy of the brazing material of the invention is evenly spread on the surface of the heater and the cathode then placed thereon. This subassembly is then put into a reducing furnace and heated to a temperature slightly above 1,650°C until the alloy was visually seen to flow indicating that the alloy had become liquid to wet and weld the adjoining surfaces. The welded subassembly was then removed from the hot zone to avoid over exposure of the cathode emitting materials to the alloying temperature.

Tubes fabricated using such cathode-heater subassemblies brazed together with brazing material of the invention have been found to be of superior performance over an extended life period considerably longer than similar tubes fabricated using prior art brazing materials.

What I claim as new and desire to secure by Letters Patent of the United States is:

1. A composite assembly useful for fabricating electrodes of refractory metals in electron discharge devices comprising a brazing alloy of tungsten and vanadium having a melting point of 1,635°C joining together a plurality of refractory metal members selected from the group consisting of hafnium, zirconium, vanadium, niobium, tantalum, molybdenum, and tungsten metals.

2. The assembly of claim 1 wherein the brazing alloy comprises about 15 weight percent tungsten and about 85 weight percent vanadium.

3. The assembly of claim 1 wherein said alloy consists essentially of tungsten and vanadium in a ratio of 4.5 atomic percent tungsten to about 95.5 atomic percent vanadium.

4. The assembly of claim 1 wherein the ratio of tungsten and vanadium in the alloy comprises a eutectic mixture.

* * * * *